United States Patent
Bugnon et al.

(10) Patent No.: US 6,397,056 B1
(45) Date of Patent: May 28, 2002

(54) SYSTEM AND METHOD FOR REDUCING NETWORK SIGNALING LOAD IN A RADIO TELECOMMUNICATIONS NETWORK

(75) Inventors: Jacques Bugnon, Repentigny; Binh Nguyen, Ville St-Laurent, both of (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/303,035

(22) Filed: Apr. 30, 1999

(51) Int. Cl.[7] .............................................. H04M 1/66
(52) U.S. Cl. ...................... 455/411; 455/433; 455/510
(58) Field of Search ............................... 455/411, 410, 455/432, 433, 510

(56) References Cited

U.S. PATENT DOCUMENTS

| | | | |
|---|---|---|---|
| 5,708,710 A | 1/1998 | Duda | 380/21 |
| 6,236,852 B1 * | 5/2001 | Veerasamy | 455/411 |

FOREIGN PATENT DOCUMENTS

| | | |
|---|---|---|
| WO | WO 98/31161 | 7/1998 |
| WO | WO 98/31162 | 7/1998 |
| WO | WO 98/31164 | 7/1998 |

* cited by examiner

*Primary Examiner*—Vivian Chin
*Assistant Examiner*—James Moore
(74) *Attorney, Agent, or Firm*—Smith, Danamraj & Youst, P.C.; Sandra Beauchesne

(57) ABSTRACT

A system and method of reducing control message signaling load in a radio telecommunications network. When an authentication request is issued by the mobile switching center (MSC), the home network performs authentication of the visiting subscriber. When authentication fails the home network determines if a threshold value is reached. If so, a suitable authentication code portion is included in the return message so that local authentication of the visiting subscriber may be performed. The MSC is able to locally authenticate a visiting subscriber trying to access the network thereby suppressing the transmission of additional authentication requests and failure reports to the home network. For failed authentications, the VLR transmits authentication failure reports to the home network. If a threshold value is reached the MSC locally authenticates the mobile subscriber's subsequent attempts so that the VLR is precluded from sending additional authentication failure reports to the home network.

14 Claims, 7 Drawing Sheets

SYSTEM AND METHOD FOR REDUCING NETWORK SIGNALING LOAD IN A RADIO TELECOMMUNICATIONS NETWORK

BACKGROUND OF THE INVENTION

1. Technical Field of the Invention

This invention relates to telecommunication systems and, more particularly, to a system and method for reducing the network signaling load in a radio telecommunications network after a mobile subscriber has failed authentication pursuant to accessing a network while roaming in a visited service area.

2. Description of Related Art

Continuous improvement in subscriber services has been a much sought-after goal in the radio telecommunications industry since its beginnings. Generally, providing improved subscriber services is predicated upon efficient utilization of network resources associated with a radio telecommunications network. One of the key aspects in this regard is the availability of resources, for example, the bandwidth of communication links comprising the network, for legitimate users or subscribers. Another related aspect is the reduction or minimization of unwanted network traffic attributable to fraudulent users or to subscribers who fail certain security measures associated with the network.

In order to reduce fraud in radio telecommunications networks, existing networks include an authentication center (AC) which is normally co-located with a home location register (HLR). The AC is utilized to perform a verification of the identity of a mobile station each time the mobile station accesses the network. Each subscriber has an authentication key (A-key) stored in the AC and in the mobile station. For security reasons, the A-key is typically never sent out in it's unencrypted (or "plaintext") form to other nodes in the network. Instead, the AC constructs what is known as Shared Secret Data (SSD). SSD is authentication data which may be shared between the AC, the HLR, the mobile station, and the mobile switching center (MSC) serving the mobile station. The SSD is normally calculated utilizing a random number, the subscriber's A-key, and other factors such as the mobile identification number (MIN) and electronic serial number (ESN) of the subscriber's mobile station. Typically, the SSD may be sent from the AC to any MSC where the subscriber roams.

Each time a mobile station accesses the radio telecommunications network, the access is challenged by the network which determines whether the information stored in the mobile station matches the information stored in the network's authentication center (AC). An example of such an authentication technique is what is known as a "global challenge" (GC) on the common signaling channel (for example, a random access channel or a pilot channel) and utilizes the SSD, typically for an authentication and a voice privacy function.

One of the problems in conventional global challenge authentication systems is that a fraudulent user may gain access to the network by rapidly sending (that is, "hammering") a large number of registration requests, system accesses or both, which, hereinafter may be referred to as "accesses" collectively. These accesses may include, for example, autonomous registration, power down registration, call origination, page response, or Short Message Service (SMS) page response, and the like. The serving MSC typically sends an Authentication Request message to the AC corresponding to each of these registration/system accesses if it does not have a Visitor Location Record (VLR) or the SSD of the accessing mobile station. In some instances, on the other hand, the serving MSC may have a VLR record where the SSD is already shared. Under such circumstances, the serving system typically sends an Authentication Failure Report message to the AC to report any failed accesses encountered pursuant to its authentication and/or validation procedures. Accordingly, it should be appreciated that in either scenario (that is, where the SSD is not shared and Authentication Request messages are rapidly sent, or where the SSD is already shared and Authentication Failure Report messages are rapidly sent), the HLR/AC and/or the MSC may become overloaded because of the rapid transmission of repeated messages and may enter a failed state which could allow access to the fraudulent user.

Yet another problem relating to the global challenge authentication system exists in conventional implementations. When a roaming subscriber fails authentication upon initial access to the network and yet continues to attempt to periodically register therewith or to send system accesses thereto, unnecessary and undesirable signaling load is caused by the control message flow between a home network and a visited network due to the periodic attempts. Clearly, such network signaling load negatively impacts the available bandwidth of the communication link therebetween.

Moreover, as can be easily realized, undesirable signaling load may also be encountered when a VLR record pertaining to a previously authenticated mobile station is "hijacked" by a fraudulent user who uses a "clone" mobile station to gain access to the network but repeatedly fails authentication by the serving MSC/VLR which already has the SSD. The repeated Authentication Failure Report messages transmitted from the VLR to the HLR/AC because of the repeated failed attempts at access, therefore, also negatively impact the available network bandwidth.

Accordingly, based upon the foregoing discussion, it should be readily appreciated that in order to overcome the deficiencies, shortcomings and problems set forth above, it would be advantageous to have a method and system for reducing unnecessary and/or undesirable network signaling load that is generated when a failed user, fraudulent or otherwise, repeatedly attempts to access the network. The present invention provides such a method and system.

SUMMARY OF THE INVENTION

In one aspect, the present invention is directed to a radio telecommunications network system which includes a home network for controlling cellular communication of a subscriber over a home service area, the home network including a Home Location Register (HLR) and an authentication center (AC). A visited network of the radio telecommunications network system is included for controlling cellular transmission over a visited service area. The visited network (or the serving system) comprises a serving mobile switching center (MSC) and an associated Visitor Location Register (VLR). There are means in the network for sending a return message from the home network to the MSC upon determining, in the HLR/AC, that a threshold value associated with one or more network access attempts by the subscriber is reached or exceeded, when it is located in the visited service area as a roaming subscriber and repeatedly attempts to access the radio telecommunications network system. The return message includes an authentication code portion. In addition, there are means in the serving MSC for locally authenticating the roaming subscriber based upon the authentication code portion received from the home network, when the roaming subscriber attempts to re-access the radio telecommunications network system after it is initially denied access by the AC in the home network.

In another aspect, the present invention is directed to a method of reducing control message signaling load in a radio telecommunications network system. The network system is preferably of the type which includes a home network, comprising an HLR and an associated AC, and a visited network comprising a serving MSC and an associated VLR. When a visiting subscriber roams into a visited service area serviced by the visited network and periodically attempts to access the network, the method of the present invention forwards one or more corresponding authentication requests from the visited network to the home network. Upon detecting authentication failure, the home network determines if a threshold value associated with the periodic attempts to the network is triggered. Responsive to the determination step in the home network, a return message is sent from the home network to the serving MSC which includes an authentication code portion required for authenticating the visiting subscriber. Upon receiving the return message, the MSC performs local authentication of the visiting subscriber if it attempts to re-access the radio telecommunications network and suppresses the forwarding of corresponding additional authentication requests to the home network.

In a yet further aspect, the present invention relates to a method of authenticating a mobile station requesting access to a radio telecommunications network which includes a serving MSC serving the mobile station, a VLR associated with the serving MSC, an HLR which stores subscriber information and location information relating to the mobile station, and an AC associated with the HLR. The AC and the HLR preferably form a home network for the mobile station. After receiving one or more access attempts from the mobile station in the serving MSC, corresponding authentication requests are sent from the serving MSC to the AC via the VLR and the HLR. The home network determines, upon detecting that mobile station failed authentication after one or more attempts to access the network, if a threshold value associated with the access attempts is exceeded or reached. If so, a return message is sent from the home network to the serving MSC with an instruction to deny the mobile station access to the network. The return message preferably includes shared data for authenticating the mobile station. Whenever subsequent network access attempts are received from the mobile station, the serving MSC determines whether the mobile station passes local authentication. Also, instructions are suppressed in the serving MSC to send authentication failure reports to the AC if the mobile station fails subsequent local authentication. A subsequent authentication request is sent from the serving MSC to the AC once the mobile station passes validation pursuant to a subsequent local authentication. In response, the AC in the home network then authenticates the mobile station.

In a still further aspect, the present invention is directed to a method of authenticating a mobile station requesting access to a radio telecommunications network when a visited network already has a shared authentication code for the mobile station. The visited network preferably includes a serving or visited MSC serving the mobile station and a VLR associated with the serving MSC. A home network comprises an HLR which stores subscriber information and location information relating to the mobile station, and an AC associated with the HLR. When the serving MSC receives one or more attempts to access the radio telecommunications network by the mobile station, it verifies the mobile station's attempts by issuing one or more locally requested validation/authentication procedures, corresponding to the mobile station's attempts. In one exemplary embodiment, the local validation/authentication procedure comprises issuing a unique challenge order to the mobile station. When the VLR determines that the mobile station failed authentication, it sends one or more authentication failure reports to the AC, each corresponding to an authentication failure by the mobile station. If the home network subsequently determines that the authentication failure reports have exceeded a threshold value associated therewith, it sends a return message to the serving MSC with an instruction to locally authenticate the mobile station for subsequent accesses to the network. Also, the VLR is instructed to stop sending authentication failure reports to the AC if the mobile station fails local authentication for its subsequent accesses to the network.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
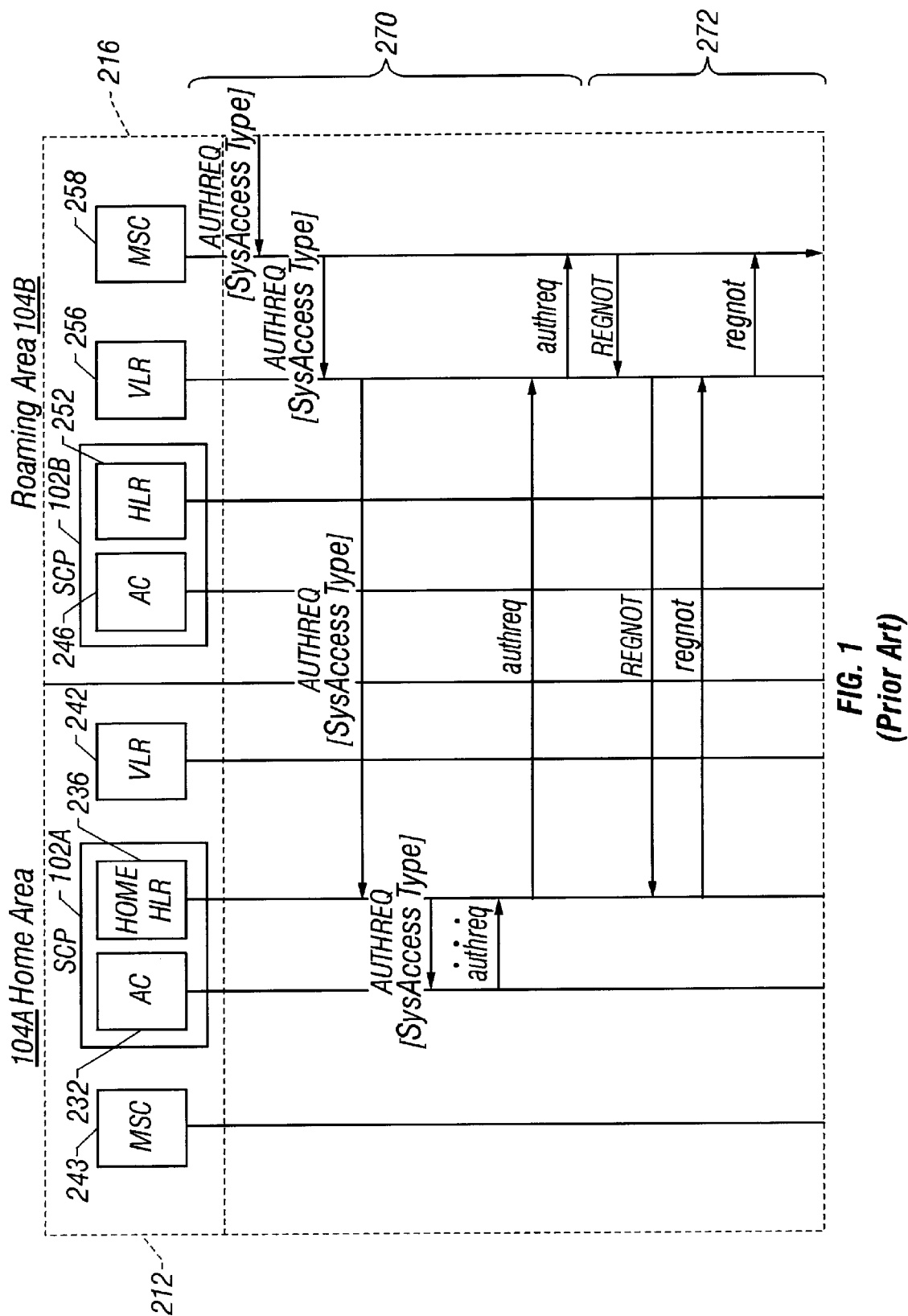
FIG. 1 depicts a simplified control message flow pathway between a home network and a visited network pursuant to registration or a system access by a visiting subscriber.

In the drawings, like or similar elements are designated with identical reference numerals throughout the several views, and the various elements depicted are not necessarily drawn to scale. Referring now to FIG. 1, depicted therein is a simplified flow pathway is shown for control messages that are transmitted pursuant to registration and/or a system access of a mobile station used by a visiting mobile subscriber who roams into a visited service area (or roaming area) 104B from a home service area (or home area) 104A. The home service area 104A is serviced by a Service Control Point 102A which includes a Home Location Register (home HLR) 236 and Authentication Center (AC) 232, a mobile switching center (MSC) 243 and a Visitor Location Register (VLR) 242. Similarly, the visited service area 104B is serviced by a Service Control Point 102B which includes a Home Location Register (HLR) 252 and Authentication Center (AC) 246, a mobile switching center (MSC) 258 and a Visitor Location Register (VLR) 256. The components servicing the home service area 104A may be treated together as a home network 212, whereas the components servicing the visited service area 104B may likewise be treated as a visited network 216. It should be appreciated by those skilled in the art that although the components of the home and visited networks are shown as separate functional blocks, in some embodiments they may be integrated together into any combination. For example, as is conventionally known in the art, the HLR and AC are commonly provided as a single node. Also, in some instances, the MSC and VLR may be combined as a visited MSC. Furthermore, the MSC and VLR of the visited network 216 may collectively be referred to as a "serving system," wherein the MSC is known as the "serving MSC".

When the MSC 258 detects that a mobile subscriber has roamed into the visited service area 104B or when the mobile subscriber attempts an access to the network while located therein, an Authentication Request (AUTHREQ) message is transmitted or propagated in stages from the visited network 216 to the home network 212. The Authentication Center 232 in the home network 212 responds to the received AUTHREQ message and sends a return message to indicate whether the mobile subscriber is allowed to access the network (i.e., authenticated) in the visited service area 104B. The return message stages or segments are shown collectively as authreq message segments transmitted or propagated back to the MSC 258. As is common in the art, in FIG. 2, invoked Authentication Request messages are shown in upper case letters and responses to them are shown in lower case letters, all collectively denoted by reference numeral 270. These invoked and returned messages are common to various types of system accesses.

Once the mobile station used by the visiting subscriber has been authenticated, the subscriber's location can be registered with the home HLR 236, as may be indicated by a plurality of appropriate messages, for example, by the REGNOT and regnot messages 272 shown herein. Also, upon successful authentication, the home network 212 transmits the SSD for the mobile subscriber to the MSC 258 so that it can locally authenticate the mobile subscriber for subsequent accesses.

As provided in the Background section of the present patent application, even after the visiting subscriber has failed authentication, it may typically continue to attempt to periodically access the home network 212 in a conventional network system. Because of the periodic attempts at registration and/or system accesses, control message signaling load relating to the Authentication Request messages 270 continues to escalate within the network system, thereby unnecessarily using up at least a portion of the available link bandwidth between the home and visited networks.

Figure 2A:
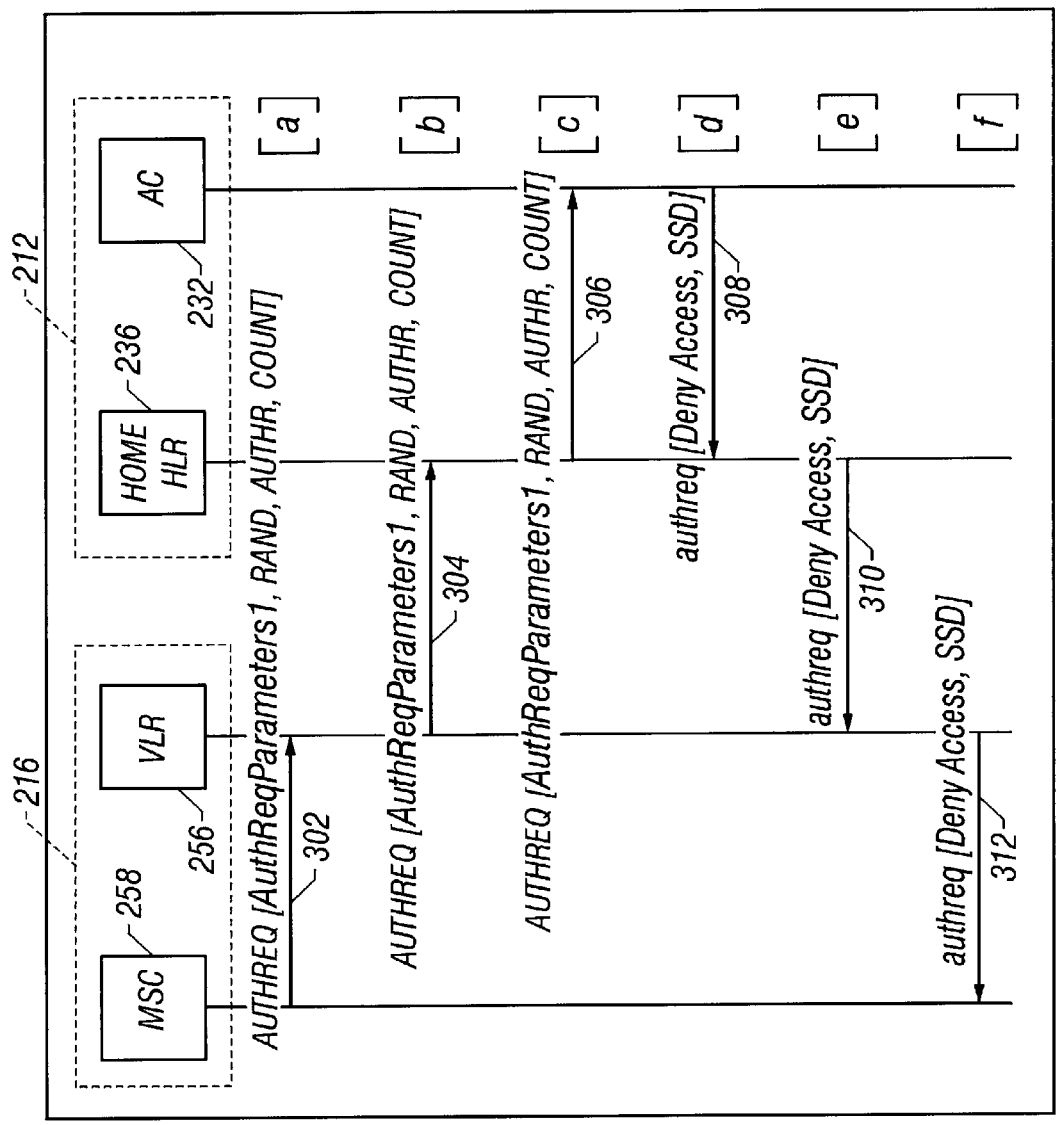
FIG. 2A depicts a control message flow pathway for effectuating an aspect of the present invention when the SSD is not shared and repeated authentication failures are encountered upon initial access.

FIG. 2A depicts a control message flow pathway provided in accordance with the teachings of the present invention for effectuating one aspect thereof, wherein the SSD is not initially shared the visited network 216 and repeated authentication failures are encountered upon initial access. For the sake of brevity, only relevant component portions of the home and visited networks, 212 and 216, respectively, are shown. Pursuant to repeated registration/system accesses, one or more AUTHREQ messages with appropriate parameters are transmitted or "hammered" from the serving MSC 258 to the home network 212, as described hereinabove. These AUTHREQ messages are propagated via the VLR 256 and the home HLR 236 to the AC 232 of the home network. This message propagation is shown as three propagation segments, segment [a] 302, segment [b] 304 and segment [c] 306. If the mobile subscriber fails authentication as determined by the AC 232, an authreq return message or response is transmitted back therefrom. In accordance with the teachings of the present invention, responsive to a number of AUTHREQ messages from the visited network, the home network determines, upon a preselected threshold value, that the authreq return message is to be modified to include an authentication code portion (such as, for example, the SSD or an encrypted A-key) in addition to the Deny Access parameter so that local authentication may be effectuated by the visited network 216. That is, the visited MSC is now capable of performing authentication/validation of the visiting mobile station and, in accordance herewith, it does not report authentication failures, if any, back to the HLR. The propagation of the authreq return message is shown in three segments, segment [d] 308, segment [e] 310 and segment [f] 312.

Accordingly, upon receiving the propagated authreq return message, the serving MSC 258 marks the failed mobile station for local authentication/verification. Consequently, the serving MSC is instructed to authenticate the failed mobile subscriber itself if repeated attempts at registration and/or system access are made, by utilizing the received authentication code portion from the home network 212. Further, the MSC 258 (in combination with the VLR 256) is provided with the capability to suppress additional Authentication Failure Report (AFREPORT) messages (not shown) for the failed mobile subscriber until a positive authentication is made by the serving MSC 258. Once a positive authentication is made by the MSC 258, it can then issue a regular AUTHREQ message with appropriate parameters to the home network 212. In response, the HLR/AC combination may also proceed with the step of positively authenticating the mobile subscriber. It should be readily appreciated, consequently, that undesirable control signaling load attributable to repeat attempts by the failed mobile subscriber to access the network in the roaming area is substantially reduced.

It should be further realized that the threshold value in the foregoing discussion, which triggers the determination in the home network to include shared authentication data in the return message, may be defined in numerous ways dependent upon specific implementations. For example, it can include any combination of the number and frequency of the repeatedly received AUTHREQ messages, system access type, time delays, et cetera.

Figure 2B:
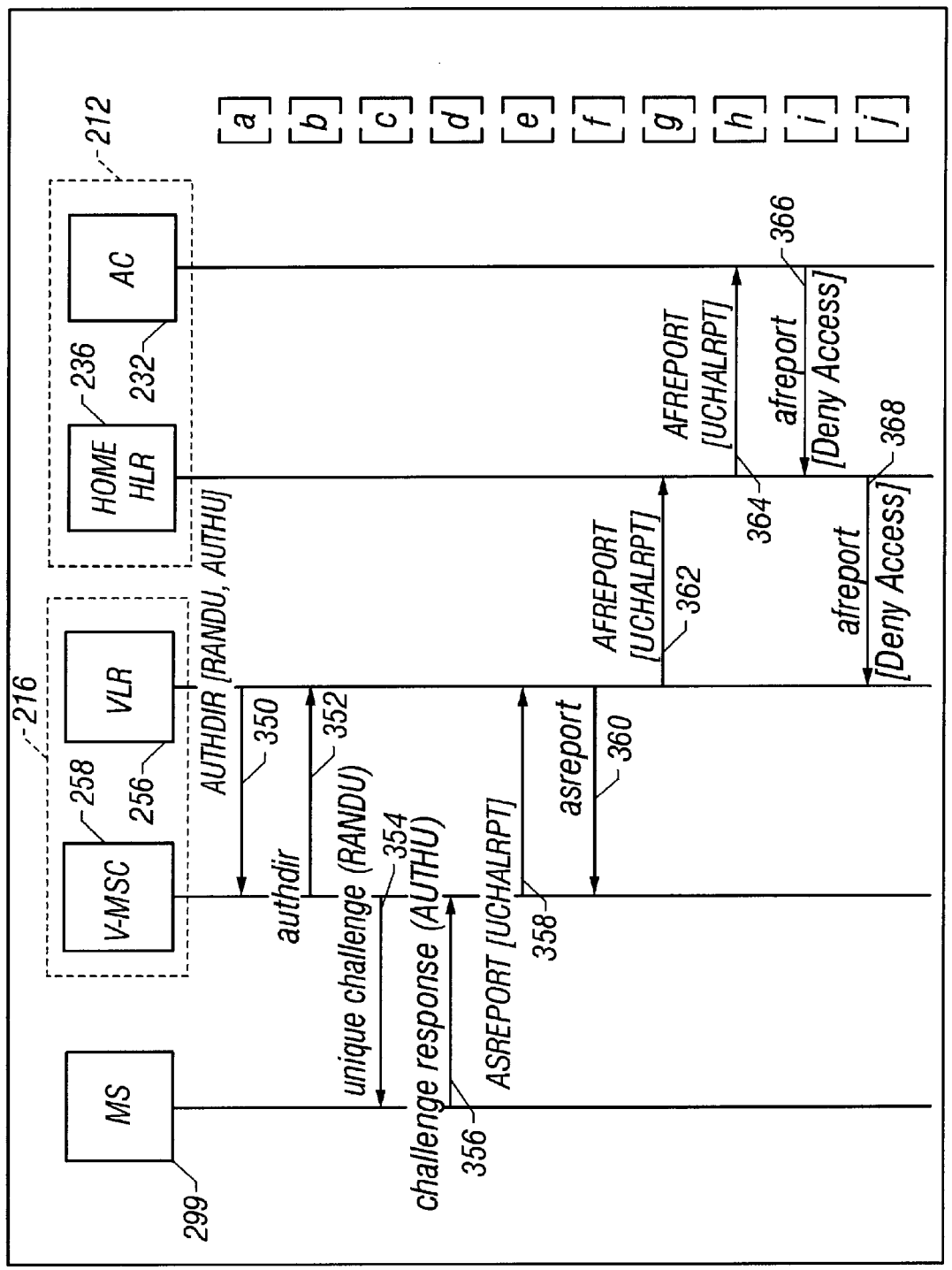
FIG. 2B depicts a control message flow pathway for effectuating another aspect of the present invention when the SSD is shared and repeated authentication failures are encountered thereafter.

Referring now to FIG. 2B, depicted therein is a control message flow pathway provided in accordance with the teachings of the present invention for effectuating another aspect thereof, wherein the SSD is shared and repeated authentication failures are encountered after a VLR record already exists for a visiting mobile station (MS) 299 (which may have been hijacked by a fraudulent user). When the SSD is shared with the visited network 216, the serving VLR 256 assumes the responsibility of issuing an appropriate authentication/validation local procedure such as, for example, a Unique Challenge, for the purpose of authenticating the visiting MS 299. It should be understood that although the Unique Challenge procedure is described hereinbelow for the purpose of exemplifying the teachings of the present invention, any VLR-associated authentication/validation (that is, locally requested procedure) is equally applicable within the scope hereof.

Continuing to refer to FIG. 2B, the serving VLR 256 chooses a Unique Random Variable (RANDU) and executes a procedure known as CAVE procedure using the currently stored SSD, ESN, MIN1 and MIN2 associated with the MS 299 to produce an Authentication Response for Unique Challenge (AUTHU). The VLR 256 sends an Authentication Directive (AUTHDIR) message 350 to the serving MSC 258 using the RANDU and AUTHU as parameters. A response message, authdir 352 is transmitted back from the serving MSC 258 to the VLR 256 to inform the VLR that the serving MSC has accepted the Directive.

The serving MSC 258, subsequently, sends a Unique Challenge order 354 with the RANDU parameter provided in the AUTHDIR to the visiting MS 299. In response, the visiting MS 299 executes the CAVE algorithm using the RANDU, the SSD stored therein, ESN, MIN1 and MIN2 to produce its Unique Challenge Response (AUTHU) which is sent back to the serving MSC 258. Accordingly, this signal flow segment [d] 356 is shown to include the MS-created AUTHU value. The serving MSC 258 then compares the value of AUTHU provided in the AUTHDIR message from the VLR 256 with the value of AUTHU transmitted back from the MS 299. After the comparison, the MSC 258 sends an Authentication Status Report (ASREPORT) message 358 to the VLR 256 to indicate that the Unique Challenge process has been completed.

In response to the received ASREPORT message 358, the serving VLR 256 issues a return message, asreport, 360 to the MSC 258. Further, if the Unique Challenge process has failed to authenticate the visiting MS 299, the serving VLR 256 also issues an AFREPORT 362 message to the home HLR 236 of the home network 212. This message is propagated to the AC 232 via the signal flow segment [h] 364.

In accordance with the teachings of the present invention, when repeated AFREPORT messages are sent to the home network, the AC 232 of the home network 212 is provided with a threshold value algorithm in a similar manner described hereinabove with respect to the situation wherein the SSD is initially unavailable with the visited network. When a selected threshold value is reached or triggered, the AC 232 issues an afreport return message 366 with a modified or suitably expanded Deny Access parameter. The afreport message is propagated from the HLR 236 to the serving VLR via the flow segment [j] 368. The expanded Deny Access parameter of the afreport return message preferably includes an indication that instructs the serving MSC 258 to engage in local authentication or validation of the failed MS 299 so that the VLR 256 does not send the AFREPORT messages 362 repeatedly. The local authentication of the failed MS 299 may preferably continue until it passes the Unique Challenge procedure, whereupon the VLR 256 will activate its normal authentication procedure.

Once more, it should be realized again that the threshold value in the foregoing discussion, which triggers the determination in the home network to include a modified Deny Access parameter in the afreport return message, may be defined in numerous ways dependent upon specific implementations. For example, it can include any combination of the number and frequency of the repeatedly received AFREPORT messages, time intervals/delays, et cetera.

Figure 3A:
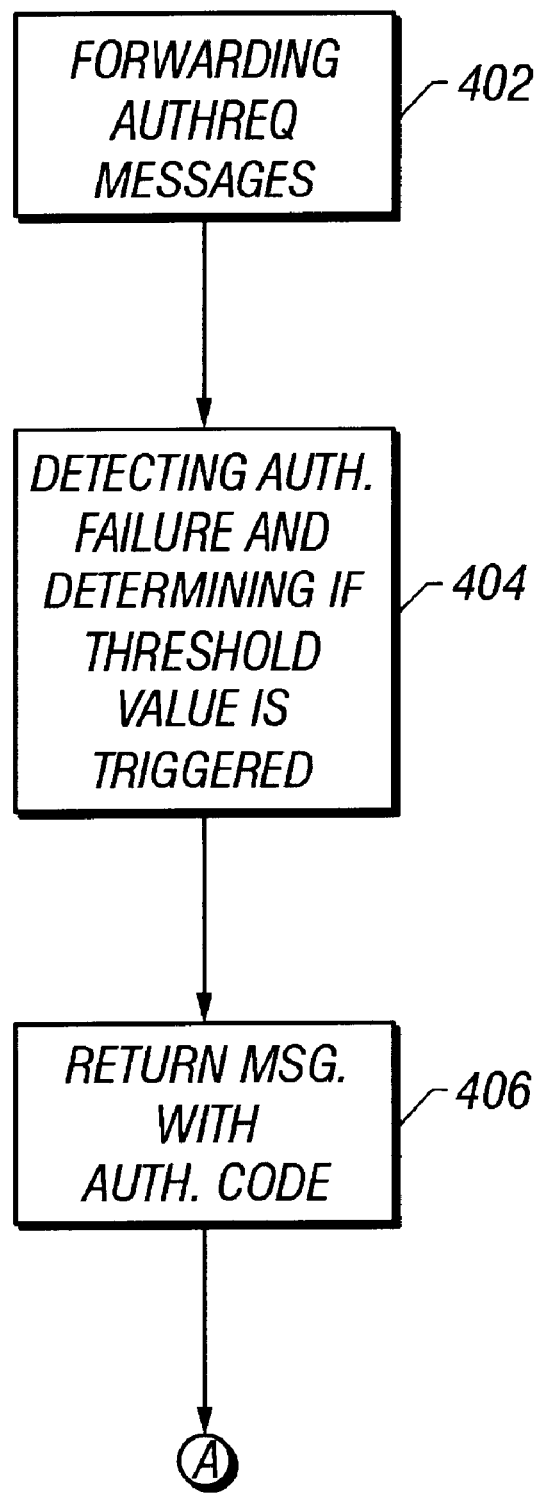
FIGS. 3A and 3B depict a flow diagram of an exemplary method of reducing control message signaling load between a home network and a visited network in accordance with one aspect of the present invention.
Figure 3B:
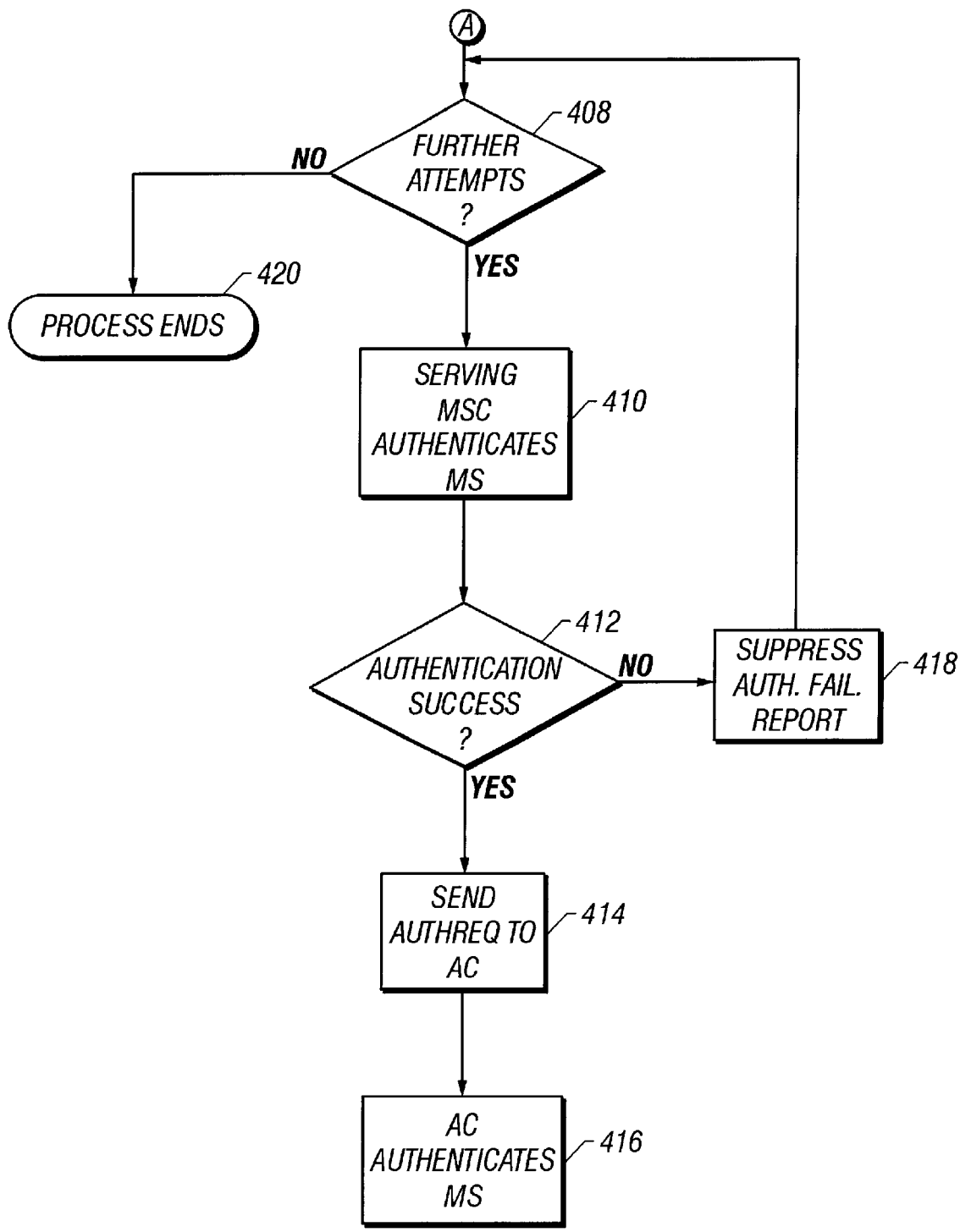
Figure 4:
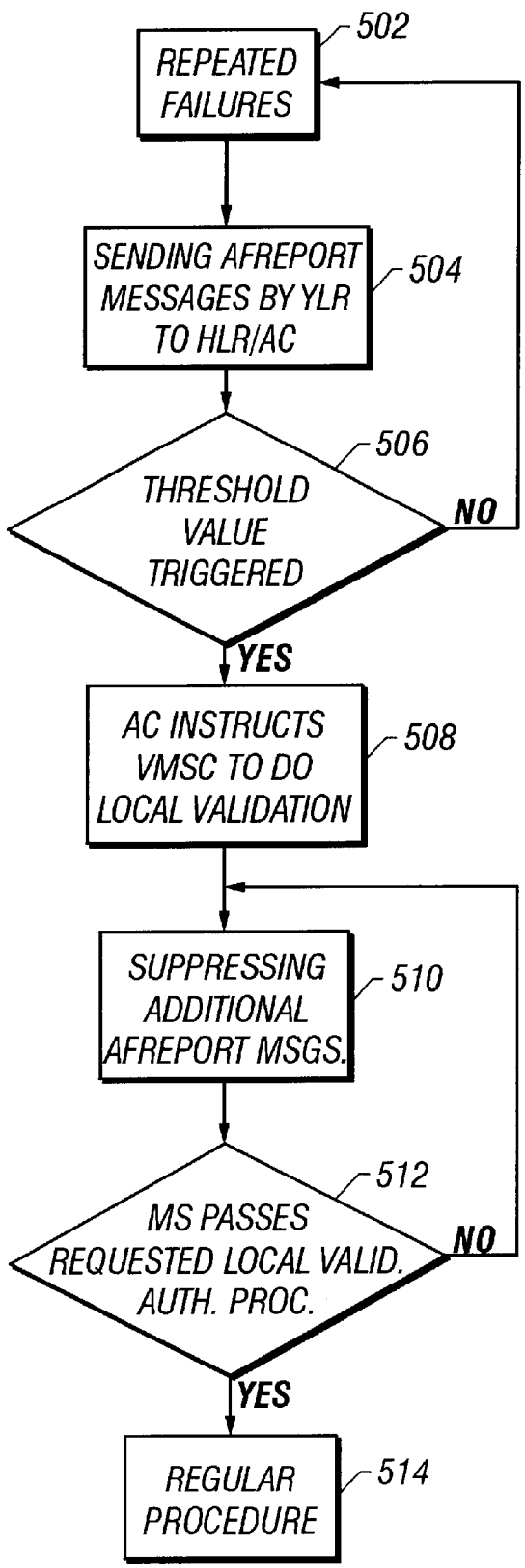
FIG. 4 depicts a flow diagram of an exemplary method of reducing control message signaling load between a home network and a visited network in accordance with another aspect of the present invention.

FIGS. 3A, 3B and 4 depict two flow diagrams which illustrate an exemplary embodiment of the processes set forth above in relation to the two aspects of the present invention, respectively. Referring to FIGS. 3A and 3B in particular, upon forwarding one or more AUTHREQ messages with appropriate parameters to the home network 212 by the MSC 258 (step 402), an authentication failure is determined or detected by the AC 232 (step 404). An authreq return message is propagated back from the home network 212 to the MSC 258 (step 406), which return message contains a suitable authentication code portion such as, for example, the SSD, upon determination in the home network that a preselected threshold value is triggered. If further attempts are made by the failed mobile subscriber to register or access the network (as denoted by the decision block 408), the MSC 258 is instructed to authenticate the visiting subscriber itself (step 410). If the authentication step by the serving MSC 258 is successful (decision block 412), it can issue a regular AUTHREQ message with appropriate parameters to the AC in the home network 212 (step 414). The AC may then proceed to authenticate the mobile subscriber in the normal fashion (step 416). If the authentication by the MSC results in a failure, the MSC 258 may be instructed (in combination with the VLR 256, in some implementations) to suppress additional Authentication Failure Report (AFREPORT) messages for the failed mobile subscriber (step 418), if necessary, until a positive authentication is made by the MSC 258. If no further attempts are made, the flow control of the process is returned (step 420).

Referring now to FIG. 4, when repeated failures are encountered by the mobile subscriber (step 502) in a visited network that already has the shared authentication data (i.e., SSD), a plurality of AFREPORT messages are sent by the serving VLR 256 to the HLR/AC of the home network 212 (step 504) as described hereinabove in relation to FIG. 2B. In accordance with an appropriate threshold value algorithm, a determination is made if a suitable threshold value is triggered (decision block 506). Until the threshold value is triggered, the visited network 216 may keep sending the AFREPORT messages to the home network 212, by taking the NO path from the decision block 506. If the threshold value is triggered, the AC 232 generates an afreport return message with a suitably expanded Deny Access parameter to instruct the visited MSC 258 to engage in local authentication/validation of the failed mobile subscriber (step 508). Further, pursuant to the local authentication or validation by the visited MSC 258, additional AFREPORT messages, if any, are suppressed in the VLR 256 (step 510). The local authentication/validation by the MSC 258 preferably continues until the mobile subscriber passes the requested local authentication/validation procedure (for example, the Unique Challenge process) (step 512), whereupon regular procedures may be engaged by the serving VLR 256 (step 514).

Figure 5:
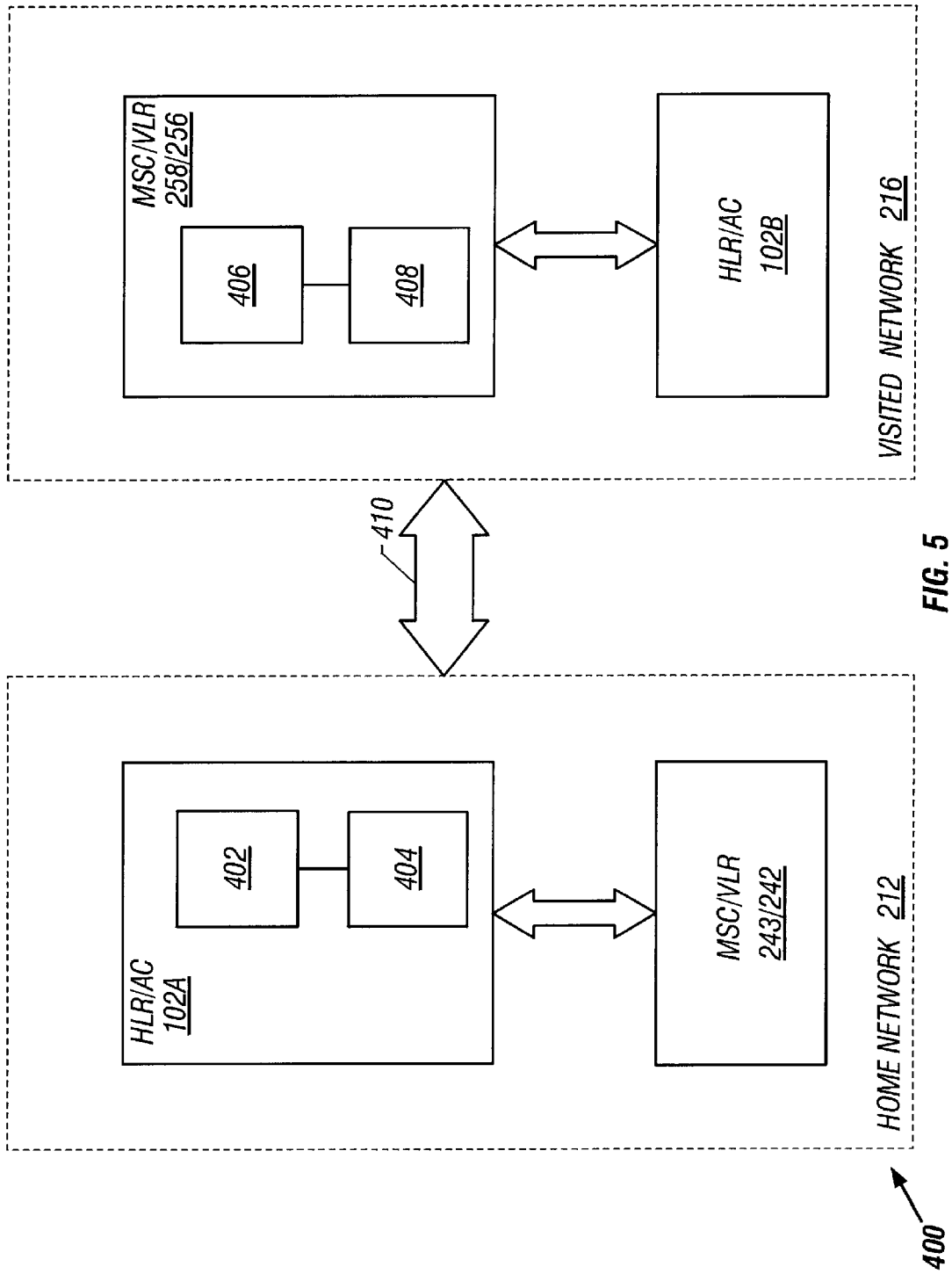
FIG. 5 depicts an exemplary embodiment of a radio telecommunications network system provided in accordance with the teachings of the present invention.

FIG. 5 depicts an exemplary embodiment of a radio telecommunications network system 400 provided in accordance with the teachings of the present invention is shown therein. The home network 212 comprises the HLR/AC node 102A in addition to the MSC/VLR complex 243/242 associated therewith. The visited network 216 comprises the HLR/AC node 102B in addition to the serving MSC and VLR complex 258/256. A suitable control signal pathway 410, for example, a Signaling System 7 (SS7) pathway, is provided between the home and visited network portions.

The node 102A is provided with an authentication/threshold logic block 402 for effectuating authentication and/or threshold value determination as described hereinabove. Coupled thereto is a sending mechanism 404 for transmitting return messages with SSD information and/or suitably expanded Deny Access parametric information to the visited network 216. The serving MSC and VLR complex 258/256 comprises an authentication logic block 406 for locally authenticating visiting subscribers in accordance with the teachings of the present invention, based upon the instructions and/or SSD information received from the home network 212. Furthermore, the serving MSC/VLR complex 258/256 comprises a suppression block 408 for suppressing the Authentication Request and Authentication Failure Report messages as described above in specific reference to FIGS. 3A, 3B and 4.

Based upon the foregoing, it should now be apparent to those of ordinary skill in the art that the present invention provides a solution which advantageously avoids the build-up of unnecessary control signaling load when a failed mobile subscriber continues to attempt to access a radio telecommunications network, whether initially (before the SSD is shared) or after the SSD is sent to the visited network. Although the system and method of the present invention have been described in particular reference to certain radio telecommunications standards (for example, the ANSI-41 standard), it should be realized upon reference hereto that the innovative teachings contained herein are not necessarily limited thereto and may be implemented advantageously with any applicable radio telecommunications standard.

Further, it is believed that the operation and construction of the present invention will be apparent from the foregoing description. While the method and system shown and described have been characterized as being preferred, it will be readily apparent that various changes and modifications could be made therein without departing from the scope of the invention as defined in the following claims.

What is claimed is:

1. A radio telecommunications network system comprising:
   a home network for controlling cellular communication of a subscriber over a home service area, the home network including a Home Location Register (HLR) and an authentication center (AC);
   a visited network for controlling cellular transmission over a visited service area, the visited network including a serving mobile switching center (MSC) and a Visitor Location Register (VLR) associated therewith;
   means for forwarding one or more authentication requests from the visited network to the home network;
   means for determining, in the home network upon detecting an authentication failure, that a threshold value associated with the network access attempts is triggered;
   means for sending a return message from the home network to the serving MSC, wherein the return message includes an authentication code portion; and
   means in the visited network, responsive to the return message from the home network, for locally authenticating the roaming subscriber based upon the authentication code portion received, when the roaming subscriber attempts to re-access the radio telecommunications network system.

2. The radio telecommunications network system as set forth in claim 1, wherein the HLR and the AC are functionally integrated into a single node and the authentication code portion comprises Shared Secret Data.

3. The radio telecommunications network system as set forth in claim 1, wherein the HLR and the AC are functionally integrated into a single node and the authentication code portion comprises an encrypted A-key value.

4. The radio telecommunications network system as set forth in claim 1, wherein the MSC and the VLR are functionally integrated into a single node and the authentication code portion comprises Shared Secret Data.

5. The radio telecommunications network system as set forth in claim 1, wherein the MSC and the VLR are functionally integrated into a single node and the authentication code portion comprises an encrypted A-key value.

6. A method of reducing control message traffic in a radio telecommunications network of the type which includes a home network, comprising a Home Location Register (HLR) and an associated Authentication Center (AC), and a visited network comprising a serving mobile switching center (MSC) and an associated Visitor Location Register (VLR), the method comprising the steps of:
   forwarding one or more authentication requests from the visited network to the home network, when a visiting subscriber roams into a visited service area serviced by the visited network and periodically attempts to access the radio telecommunications network;
   upon detecting an authentication failure, determining, in the home network, that a threshold value associated with the periodic attempts to access the network is triggered;
   responsive to the determination in the home network, sending a return message from the home network to the serving MSC, the return message including an authentication code portion required for authenticating the visiting subscriber; and
   upon receiving the return message, performing a local authentication step by the serving MSC if the visiting subscriber attempts to re-access the radio telecommunications network and thereby suppressing the forwarding of additional authentication requests to the home network.

7. The method as set forth in claim 6, further comprising the steps of:
   transmitting a subsequent authorization request from the visited network to the home network, provided the visiting subscriber has been successfully locally authenticated by the visited network; and
   responsive to the subsequent authorization request, authenticating the visiting subscriber by the home network.

8. The method as set forth in claim 6, wherein the authentication code portion comprises Shared Secret Data.

9. The method as set forth in claim 6, wherein the authentication code portion comprises an encrypted A-key.

10. The method as set forth in claim 6, further including the step of suppressing one or more authentication failure reports by the visited network, the reports being provided when the visiting subscriber continues to fail the local authentication step by the serving MSC.

11. A method of authenticating a mobile station requesting access to a radio telecommunications network having a serving mobile switching center (MSC) serving the mobile station, a visitor location register (VLR) associated with the serving MSC, a home location register (HLR) which stores subscriber information and location information relating to the mobile station, and an authentication center (AC) associated with the HLR, the AC and HLR forming a home network, said method comprising the steps of:
   receiving in the serving MSC one or more attempts to access the radio telecommunications network by the mobile station;
   sending one or more corresponding authentication requests from the serving MSC to the AC via the VLR and the HLR;
   determining in the AC that the mobile station failed authentication;
   determining in the home network that a threshold value associated with the one or more attempts to access the radio telecommunications network is triggered by the mobile station;

sending a return message from the home network to the serving MSC with an instruction to deny the mobile station access to the network, said return message including shared data for authenticating the mobile station;

determining in the serving MSC whether the mobile station passes local authentication whenever subsequent network access attempts are received from the mobile station;

suppressing instructions in the serving MSC to send authentication failure reports to the AC if the mobile station fails subsequent local authentication;

sending a subsequent authentication request from the serving MSC to the AC if the mobile station passes a subsequent local authentication; and authenticating the mobile station in the AC.

12. A method of authenticating a mobile station requesting access to a radio telecommunications network having a serving mobile switching center (MSC) serving the mobile station, a visitor location register (VLR) associated with the serving MSC, a home location register (HLR) which stores subscriber information and location information relating to the mobile station, and an authentication center (AC) associated with the HLR, the AC and HLR forming a home network, said method comprising the steps of:

receiving in the serving MSC one or more attempts to access the radio telecommunications network by the mobile station;

verifying, by the serving MSC, the mobile station's attempts by issuing one or more locally requested validation procedures, corresponding to the attempts by the mobile station;

determining in the VLR that the mobile station failed authentication;

sending, by the VLR, one or more authentication failure reports to the AC, each corresponding to an authentication failure by the mobile station;

determining, in the home network, that the authentication failure reports have exceeded a threshold value associated therewith;

sending a return message from the home network to the serving MSC with an instruction to locally authenticate the mobile station for subsequent accesses to the network; and instructing the VLR to stop sending authentication failure reports to the AC if the mobile station fails local authentication for its subsequent accesses to the network.

13. The method as set forth in claim 12, wherein the requested local validation procedure comprises a unique challenge order.

14. The method as set forth in claim 12, further comprising the step of instructing the serving MSC to locally authenticate the mobile station until the mobile station passes the requested local validation procedure.

* * * * *